United States Patent [19]

Toral et al.

[11] Patent Number: 5,344,014
[45] Date of Patent: Sep. 6, 1994

[54] REUSABLE MULTIPACK FOR STACKED WOUND ROLLS

[75] Inventors: José Toral, Munich; Gottfried Lutz, Seefeld; Hartmut Thiele, Munich; August Liepold, Munich; Hermann Brandstetter, Munich, all of Fed. Rep. of Germany

[73] Assignee: BASF Magnetics GmbH, Mannheim, Fed. Rep. of Germany

[21] Appl. No.: 918,749

[22] Filed: Jul. 27, 1992

[30] Foreign Application Priority Data

Jul. 27, 1991 [DE] Fed. Rep. of Germany ....... 9109284

[51] Int. Cl.$^5$ ............................................. B65D 85/02
[52] U.S. Cl. ..................................... 206/394; 206/386
[58] Field of Search ............... 206/386, 391, 394, 410, 206/411, 497, 597

[56] References Cited

U.S. PATENT DOCUMENTS

| 3,227,272 | 1/1966 | Critzer | 206/394 |
|---|---|---|---|
| 3,402,809 | 9/1968 | Snyder | 206/410 |
| 3,543,922 | 12/1970 | Charlton . | |
| 4,491,222 | 1/1985 | Gacetta | 206/394 |
| 4,708,246 | 11/1987 | Minion | 206/394 |
| 4,955,471 | 9/1990 | Hirose et al. | 206/303 |
| 4,998,619 | 3/1991 | Sowa et al. | 206/394 |

FOREIGN PATENT DOCUMENTS

| 0320751 | 6/1989 | European Pat. Off. . |
|---|---|---|
| 8900709 | 5/1989 | Fed. Rep. of Germany . |
| 8912747 | 4/1990 | Fed. Rep. of Germany . |
| 8912749 | 4/1990 | Fed. Rep. of Germany . |

Primary Examiner—Jimmy G. Foster
Attorney, Agent, or Firm—Keil & Weinkauf

[57] ABSTRACT

A right-parallelepipedal multipack for vertically stacked wound rolls, comprising a rectangular pallet (1), a rectangular base plate (3), located on said pallet and provided with a multiplicity of clearances (2), an identically constructed intermediate plate (5) and a likewise identical top plate (6), a multiplicity of wound rolls (4) respectively stacked in-between and means (7, 8, 9) for fixing the pack and the wound rolls, wherein the wound rolls are recording media (10) in tape form which are wound-up on flangeless hubs (11) which are provided with inner bores and through which there is fitted a hub sleeve (8) which is mounted non-displaceably in the clearances (2) of the base plate (3), intermediate plate (5) and top plate (6), and a cover (9), provided with a ring, being adapted to fit onto the upper end of the hub sleeve (8) above the top plate, the lateral four corners of the pack being secured by vertically attached corner parts (7) and a stretch film (12) being drawn around the side parts of the pack.

3 Claims, 3 Drawing Sheets

REUSABLE MULTIPACK FOR STACKED WOUND ROLLS

FIELD OF THE INVENTION

The invention relates to a right-parallelepipedal multipack for vertically stacked wound rolls, comprising a rectangular pallet (1), a rectangular base plate (3), located on said pallet and provided with a multiplicity of clearances (2), an identically constructed intermediate plate (5) and a top plate (6), a multiplicity of wound rolls being respectively stacked in-between and means (7, 8, 9) being provided for fixing the pack and the wound rolls.

BACKGROUND OF THE INVENTION

A pack of the abovementioned generic type is known from DE 4,016,265. In the case of this device, the wound rolls are wound around a tubular hub, the ends of which project on both sides from the roll, these ends being mounted in a padding disk, which are provided with a multiplicity of clearances. These clearances are of essentially elliptical or oval form, in order that the wound rolls are moveable for fixing in a certain position. The wound rolls are firmly bound on the pallet by binding means, and there are also intermediate liners provided between the wound rolls in contact with one another. The padding disks consist of multilayered hard board with an intermediate layer which has a honeycombed structure, in order to lend it strength and stability. This type of pack is unsuitable for delicate wound rolls, such as wound-up magnetic tapes (known as pancakes), due to the risk of damage. Furthermore, the described type of pack is not reusable.

Magnetic tape multipacks are disclosed by the publications U.S. Pat. No. 3,543,922, U.S. Pat. No. 4,708,246, U.S. Pat. No. 4,955,471, EP 0 320 751, DE-U 89 00 709, DE-U 89 12 747 and DE-U 89 12 749. These packs consist either of relatively voluminous Styropor, which means that for transport they are bulky to no useful effect and have to be disposed of once the content has been unpacked, or the pack is held together by plastic pallets and sleeves, the sleeves being of a relatively complicated design and the side parts of the packed product in some cases being inadequately protected since they are covered only by a film shrink-fitted over the pack. Therefore, this pack has to be additionally placed into an outer case for transport.

SUMMARY OF THE INVENTION

Therefore, it is an object of the present invention to find a pack for pancakes of the generic type mentioned above which at the same time meets the following conditions:

restriction to the minimum possible proportion of packaging materials to be thrown away
simple design
protects the pancakes during transit and from dust
simple to assemble and unpack
not bulky in return transport
reusable
no additional outer packaging necessary.

We have found that this object is achieved by a right-parallelepipedal multipack for vertically stacked wound rolls, comprising a rectangular pallet (1), a rectangular base plate (3), located on said pallet and provided with a multiplicity of clearances (2), an identically constructed intermediate plate (5) and a likewise identical top plate (6), a multiplicity of wound rolls respectively stacked in-between and means (7, 8, 9) for fixing the pack and the wound rolls, wherein the wound rolls are recording media (10) in tape form which are wound-up on flangeless hubs (11) which are provided with inner bores and through which there is fitted a hub sleeve (8) which is mounted non-displaceably in the clearances (2) of the base plate (3), intermediate plate (5) and top plate (6), and a cover (9), provided with a ring, being adapted to fit onto the upper end of the hub sleeve (8) above the top plate, the lateral four corners of the pack being secured by vertically attached corner parts (7) and a stretch film (12) being drawn around the side parts of the pack.

Further developments of the invention emerge from the sub-claims, the drawings and the description.

SHORT DESCRIPTION OF THE DRAWINGS

The invention is explained in further detail below with reference to the drawings, in which.

DETAILED DESCRIPTION

Figure 1:
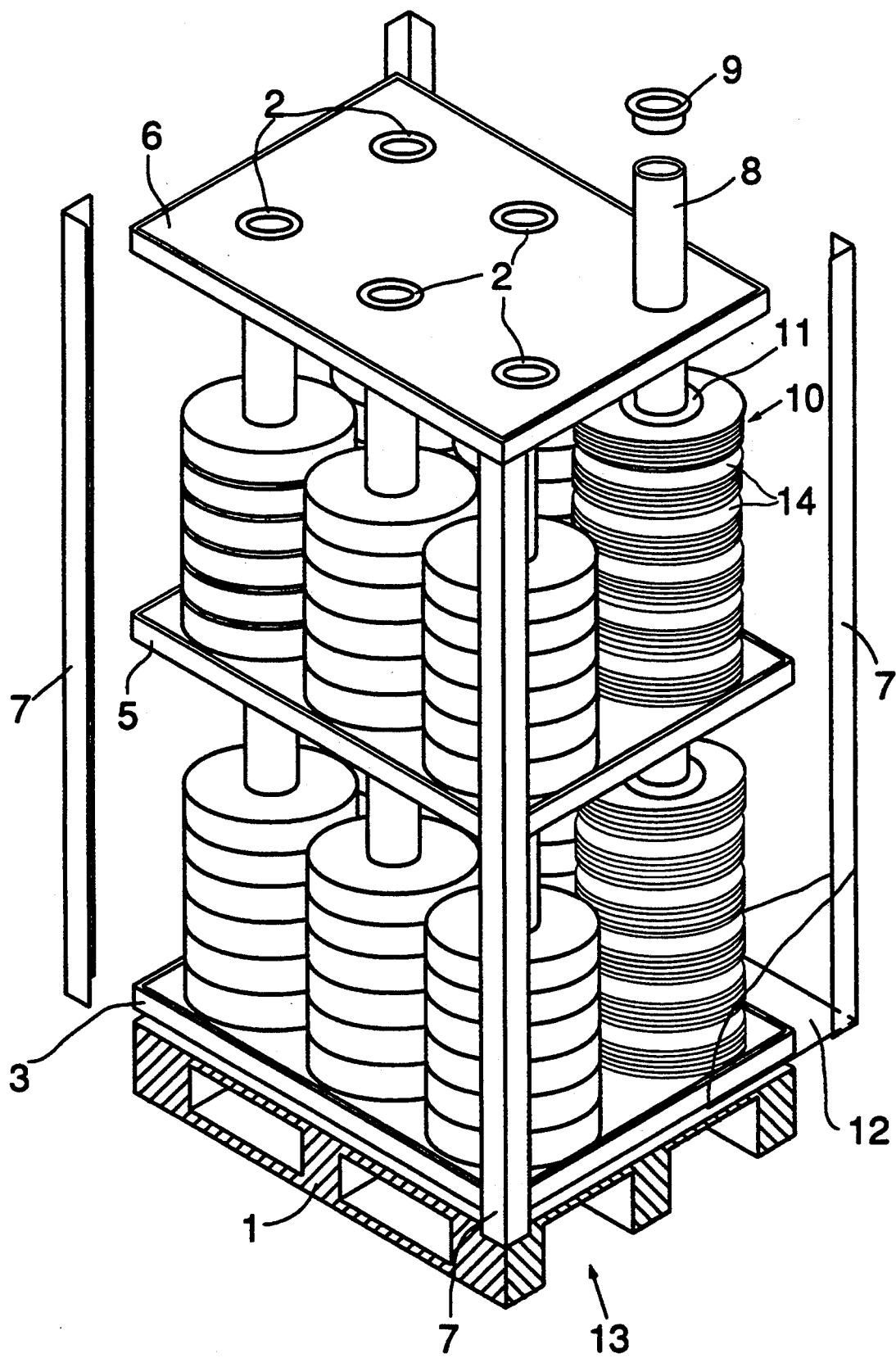
FIG. 1 shows a perspective representation of the pack according to the invention

FIG. 1 represents the diagrammatical construction of the pack. On a pallet (1), usually consisting of wood, plastic or aluminum, there rests a right-parallelepipedal base plate (3) which consists of rigid plastic such as ABS and is constructed identically to the intermediate plate (5) and the top plate (6). Each of the plates has regularly arranged circular clearances (2) for the fitting through of hub sleeves (8). The preferably hollow-cylindrically constructed hub sleeves have on one side a base (not shown), by which they stand on the pallet, and on their other side an open end. Pancakes (10) are vertically stacked up on the hub sleeves. The pancakes are preferably magnetic tapes wound up on flangeless hubs (11), the winding height of the hub corresponding approximately to the width of the magnetic tape. The flangeless hub may be what is known as an NAB hub or a hub according to U.S. Pat. No. 4,081,151, which provides protection against twisting and displacing. Of course, other flangeless hubs are also suitable. Thin plastic sheets may be respectively inserted between two pancakes to protect the edges of the magnetic tape from damage. After several layers of pancakes, for example five to six layers, plastic discs (14), consisting of foam or rigid plastic, may be provided in each case as an intermediate liner.

Figure 4:
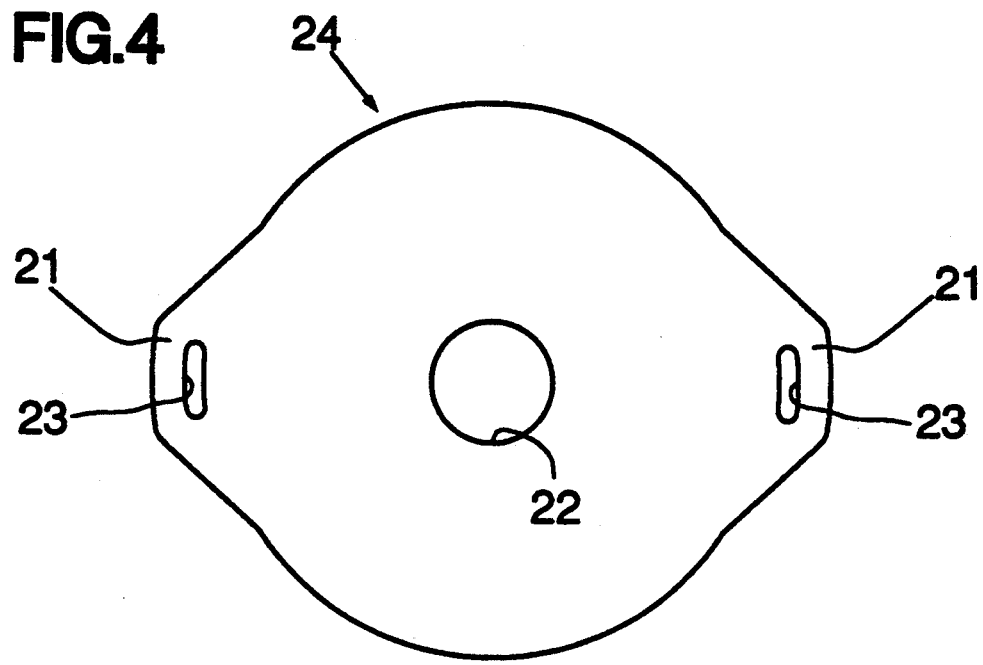
FIG. 4 shows a plan view of an intermediate liner sheet
Figure 5:
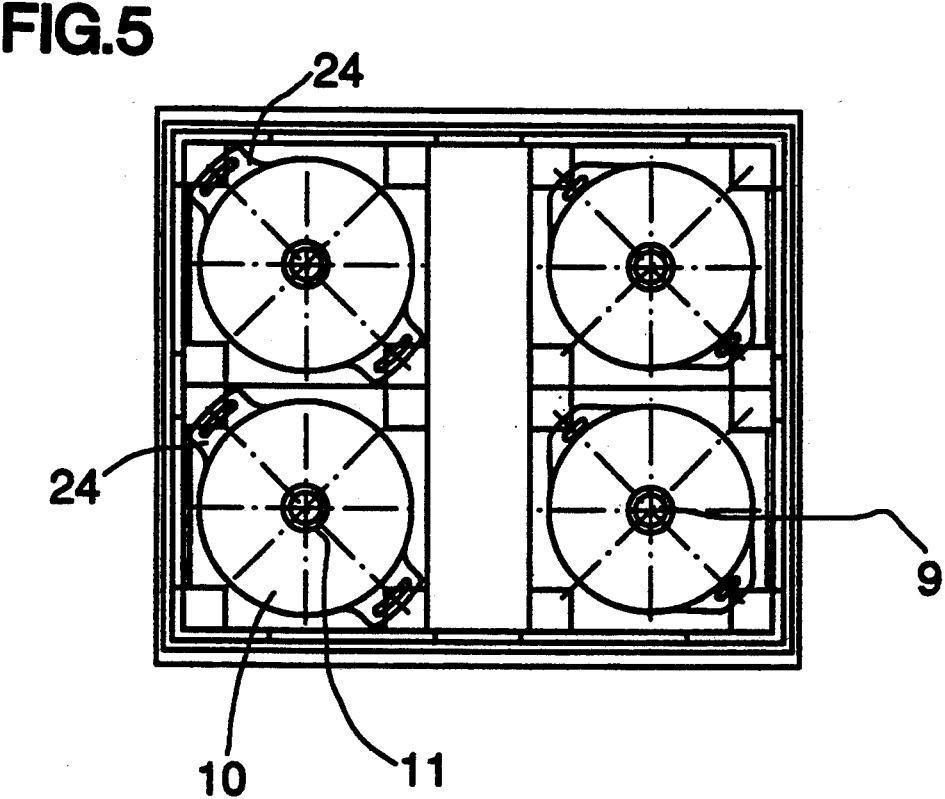
FIG. 5 shows a plan view of an embodiment of the complete pack with intermediate liner sheets according to FIG. 4.

In a modified embodiment, the intermediate liners (24) can, as FIG. 4 reveals, have at two opposite ends gripping tabs (21) with slit-shaped engaging holes (23) for the convenient lifting-out of a plurality of layers of pancakes. Furthermore, the intermediate liners have a central circular clearance (22) for fitting onto the hub sleeve. A possible arrangement of these intermediate liner sheets (24), which may consist of polyethylene terephthalate, in the complete pack is revealed by FIG. 5. In this embodiment, in contrast to FIG. 1, in each case 4 stacks of pancakes are arranged stacked vertically next to one another.

At half the geometrical height of the multipack, an intermediate plate (5) is placed on, there then follows another stack of pancakes as described above. How many rows of rolls are prepared on a pallet depends on the size of the pallet and the circumference of the pancakes.

Once the full pallet height has been reached, the top plate (6) is placed on and the open ends of the hub sleeves (8) are secured by a cover (9) with ring, which can be fitted on. Then, vertical corner parts (7), the length of which corresponds to the height of the pack, are fitted onto the four corners of the pack and a protective film (12), for instance a stretch film, is wound around the side parts of the multipack. The corner parts may consist of metal or plastic. In this way, the contents of the pack is reliably protected against dust and dirt during transit.

At the customer's, once the stretch film has been pulled off, the corner parts and the top plate are removed, after which one or more layers of pancakes can be taken off and, after taking off the intermediate plate, so too can the lower layers of pancakes.

In an example, a total of 360 pancakes, comprising ½ inch video tape and of 16-inch diameter, are transported on a Europallet in two rows on six hub sleeves. In this case, the weight of the pancakes is about 700 kg, the pack, suitable for return transport, weighs about 60 kg.

Figure 2:
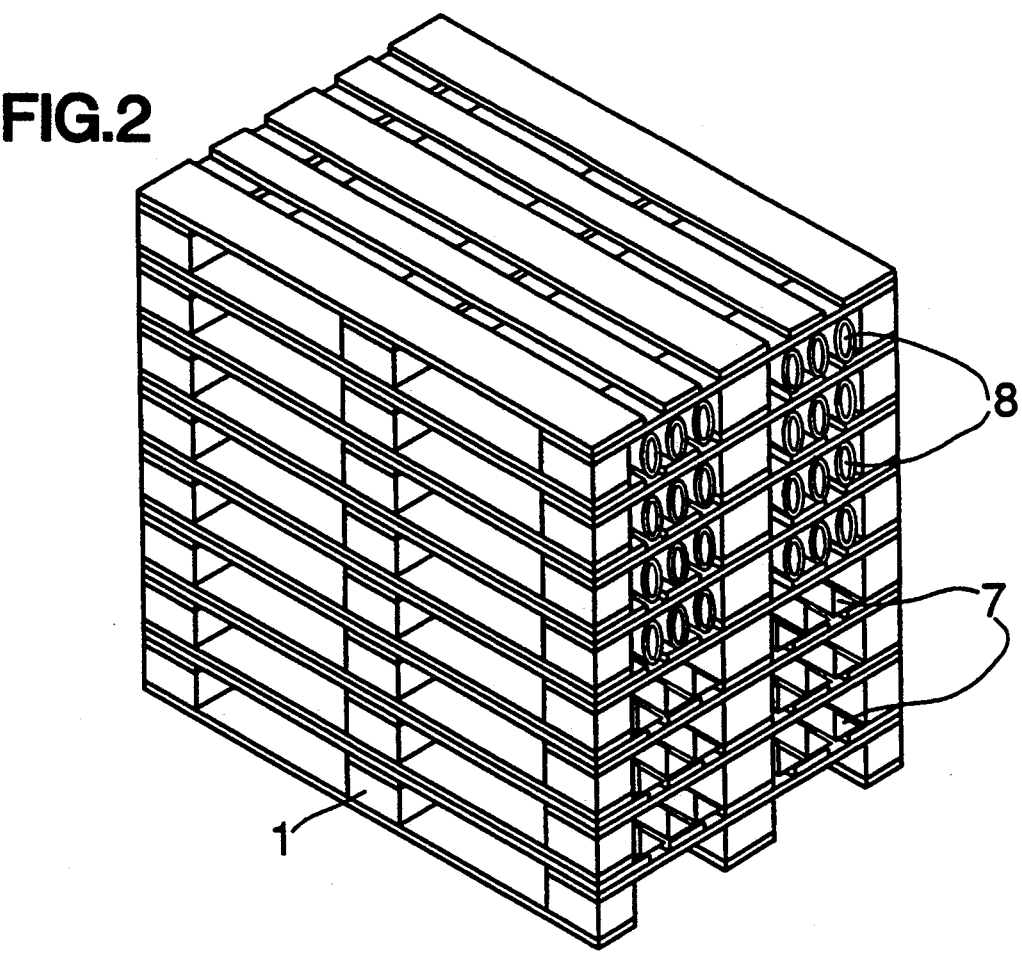
FIGS. 2–3 show the individual parts stacked one on top of the other for return transport of the packed parts.
Figure 3:
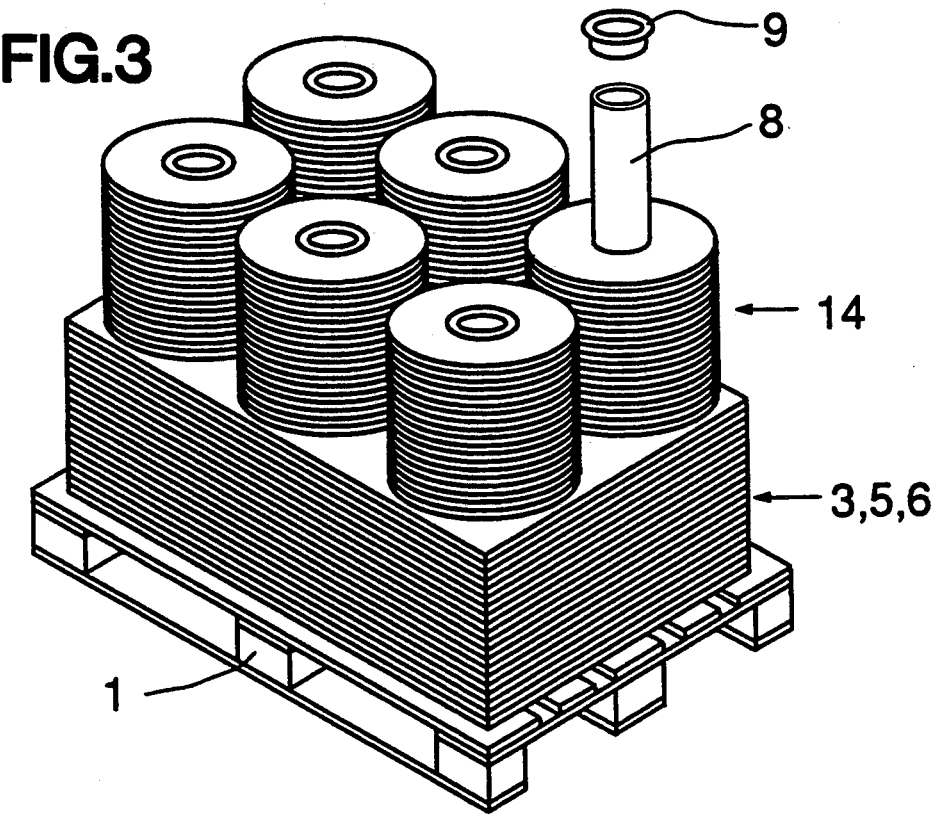

As FIGS. 2 and 3 show, the return transport of the packaging material can take place in a space-saving way. For instance, the pallets can be stacked one on top of the other, it being possible for the hub sleeves (8) and the corner parts (7) to be inserted into the intermediate spaces (13) of the underside of the pallets.

On another pallet, the base, intermediate and top plates can be returned by being stacked one on top of the other, the hub sleeves being fitted through the clearances of the plates in order to fix the plates and, as FIG. 3 shows, the plastic inserts or separating sheets, stacked one on top of the other, being fitted on in the upper part of the return pack and closed by the cover.

In this way, the objects set can be achieved completely by the multipack according to the invention.

We claim:

1. A right-parallelepipedal multipack for vertically stacked wound rolls, comprising a rectangular pallet (1), a rectangular base plate (3), located on said pallet and provided with a multiplicity of clearances (2), an identically constructed intermediate plate (5) and a likewise identical top plate (6), a multiplicity of wound rolls respectively stacked in-between said plates and means (7, 8, 9), including a hub sleeve, for fixing the multi pack and the wound rolls, wherein the wound rolls are recording media (10) in tape form which are wound-up on flangeless hubs (11) which are provided with inner bores and through which there is fitted said hub sleeve (8) which is mounted non-displaceably in the clearances (2) of the base plate (3), intermediate plate (5) and top plate (6), and a cover (9), provided with a ring, being adapted to fit onto the upper end of the hub sleeve (8) above the top plate, the lateral four corners of the multi pack being secured by vertically attached corner parts (7) and a stretch film (12) being drawn around the side parts of the multi pack.

2. A multipack as claimed in claim 1, wherein thin liners are respectively inserted between two pancakes (10) and wherein a plurality of pancakes stacked one on top of the other are spaced apart by flexible plastic inserts (14).

3. A multipack as claimed in claim 1, wherein the flexible plastic liners (24) have at two opposite ends gripping tabs (21) with engaging openings (23) for removing a pancake stack.

* * * * *